(12) United States Patent
Yang et al.

(10) Patent No.: US 12,630,258 B2
(45) Date of Patent: May 19, 2026

(54) BICYCLE REAR DERAILLEUR AND TRANSMISSION ASSEMBLY OF BICYCLE DEVICE

(71) Applicant: TEKTRO TECHNOLOGY CORPORATION, Sioushuei Township, Changhua County (TW)

(72) Inventors: Chia-Hao Yang, Sioushuei Township, Changhua County (TW); Hung-Jui Lin, Sioushuei Township, Changhua County (TW)

(73) Assignee: TEKTRO TECHNOLOGY CORPORATION, Sioushuei Township (TW)

( * ) Notice: Subject to any disclaimer, the term of this patent is extended or adjusted under 35 U.S.C. 154(b) by 0 days.

(21) Appl. No.: 18/515,376

(22) Filed: Nov. 21, 2023

(65) Prior Publication Data

US 2024/0174325 A1 May 30, 2024

(30) Foreign Application Priority Data

Nov. 25, 2022 (TW) ................................. 111145142

(51) Int. Cl.
| | |
|---|---|
| B62M 25/08 | (2006.01) |
| B62M 6/50 | (2010.01) |
| B62M 9/122 | (2010.01) |
| B62M 9/128 | (2010.01) |

(52) U.S. Cl.
CPC .............. B62M 25/08 (2013.01); B62M 6/50 (2013.01); B62M 9/122 (2013.01); B62M 9/128 (2013.01)

(58) Field of Classification Search
CPC ........ B62M 6/50; B62M 9/122; B62M 9/128; B62M 25/08
See application file for complete search history.

(56) References Cited

U.S. PATENT DOCUMENTS

| | | | | |
|---|---|---|---|---|
| 4,660,069 A | * | 4/1987 | Kochanski | ............ H01L 23/642 257/695 |
| 4,806,808 A | * | 2/1989 | Grecksch | ............... H05K 1/183 310/67 R |
| 5,631,807 A | * | 5/1997 | Griffin | ................. G02B 6/4266 361/764 |

(Continued)

FOREIGN PATENT DOCUMENTS

| | | | | | |
|---|---|---|---|---|---|
| JP | | 07066521 A | * | 3/1995 | |
| WO | WO-2019231239 A1 | * | 12/2019 | ............... G02B 7/02 | |

*Primary Examiner* — William C Joyce

(74) *Attorney, Agent, or Firm* — Nixon Peabody LLP

(57) ABSTRACT

A bicycle rear derailleur includes a base component, a movable component, a linkage assembly, a chain guide and a transmission assembly. The linkage assembly is pivotably connected to the base component and the movable component. The chain guide is pivotably disposed on the movable component. The transmission assembly is disposed on the linkage assembly. The transmission assembly comprises a driving source, a circuit board and a sensor, the driving source is configured to provide a power to the movable component to drive the movable component to move relative to the base component, the circuit board is electrically connected to the driving source, the circuit board has a first surface and a second surface located opposite to each other, the sensor is disposed on the circuit board, and the first surface and the second surface pass through the sensor.

10 Claims, 5 Drawing Sheets

(56) References Cited

U.S. PATENT DOCUMENTS

| | | | | |
|---|---|---|---|---|
| 6,154,371 | A * | 11/2000 | Oba ..................... | H05K 1/141 |
| | | | | 361/764 |
| 6,239,977 | B1 * | 5/2001 | Price .................... | H05K 1/182 |
| | | | | 361/737 |
| 6,937,478 | B2 * | 8/2005 | Lee ..................... | H05K 1/182 |
| | | | | 361/761 |
| 7,661,996 | B2 * | 2/2010 | Takahashi ............. | H05K 3/308 |
| | | | | 439/744 |
| 2014/0087901 | A1 * | 3/2014 | Shipman .............. | B62M 9/131 |
| | | | | 429/100 |
| 2021/0387696 | A1 * | 12/2021 | Sala .................... | B62M 9/122 |
| 2023/0365226 | A1 * | 11/2023 | Minto .................. | G01B 7/30 |

* cited by examiner

BICYCLE REAR DERAILLEUR AND TRANSMISSION ASSEMBLY OF BICYCLE DEVICE

CROSS-REFERENCE TO RELATED APPLICATIONS

This non-provisional application claims priority under 35 U.S.C. § 119(a) on Patent Application No(s). 111145142 filed in Taiwan, R.O.C. on Nov. 25, 2022, the entire contents of which are hereby incorporated by reference.

TECHNICAL FIELD

The disclosure relates to a rear derailleur and a transmission assembly, more particularly to a bicycle rear derailleur and a transmission assembly of a bicycle device.

BACKGROUND

In recent years, road bikes, mountain bikes and other types of bicycles are all popular in the market, and it motivates bicycle manufacturers to pay more attention on improving their products.

In present, a bicycle derailleur is mostly an electronic derailleur; that is, the electronic derailleur uses a motor to drive a chain guide for moving a bicycle chain among sprockets. Generally, the electronic derailleur may be further provided with a control circuit board and an encoder on the control circuit board for cooperating with the motor. However, the encoder is stacked on the control circuit board, and thus an overall thickness of the control circuit board and the encoder is a sum of the thickness of the control circuit board and the thickness of the encoder, which makes a casing of the electronic derailleur require more space to accommodate the encoder and the control circuit board, thereby enlarging the size of the electronic derailleur and thus adversely affecting the appearance of the electronic derailleur. As a result, how to solve the aforementioned issue is one of the crucial topics in this field.

SUMMARY

The disclosure provides a bicycle rear derailleur and a transmission assembly of a bicycle device which are small in size and is aesthetic in appearance.

One embodiment of the disclosure provides a bicycle rear derailleur. The bicycle rear derailleur includes a base component, a movable component, a linkage assembly, a chain guide and a transmission assembly. The linkage assembly is pivotably connected to the base component and the movable component. The chain guide is pivotably disposed on the movable component. The transmission assembly is disposed on the linkage assembly. The transmission assembly comprises a driving source, a circuit board and a sensor, the driving source is configured to provide a power to the movable component to drive the movable component to move relative to the base component, the circuit board is electrically connected to the driving source, the circuit board has a first surface and a second surface located opposite to each other, the sensor is disposed on the circuit board, and the first surface and the second surface pass through the sensor.

Another embodiment of the disclosure provides a bicycle rear derailleur. The bicycle rear derailleur includes a base component, a movable component, a linkage assembly, a chain guide and a transmission assembly. The linkage assembly is pivotably connected to the base component and the movable component. The chain guide is pivotably disposed on the movable component. The transmission assembly is disposed on the linkage assembly. The transmission assembly comprises a driving source, a circuit board and a sensor, the driving source is configured to provide a power to the movable component to drive the movable component to move relative to the base component, the circuit board is electrically connected to the driving source, the circuit board has a through hole, and the sensor is at least partially located in the through hole of the circuit board.

Still another embodiment of the disclosure provides a transmission assembly of a bicycle device. The transmission assembly includes a driving source, a plurality of transmission gears, a magnet, a circuit board and a sensor. The transmission gears are connected to each other and configured to be driven by the driving source. The magnet is disposed on one of the transmission gears and is rotatable. The circuit board is electrically connected to the driving source. The circuit board has a first surface, a second surface and a through hole, the first surface is located opposite to the second surface, and the through hole penetrates through the first surface and the second surface. The sensor is at least partially located in the through hole of the circuit board for measuring a rotation of the magnet.

According to the bicycle rear derailleur and the transmission assembly of the bicycle device as discussed in the above embodiments, the first surface and the second surface of the circuit board pass through the sensor, which allows an overall thickness of the circuit board and the sensor to be reduced as much as possible. Therefore, the space in the casing for accommodating the circuit board and the sensor can be reduced, and thus the bicycle rear derailleur is small in size and is aesthetic in appearance.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
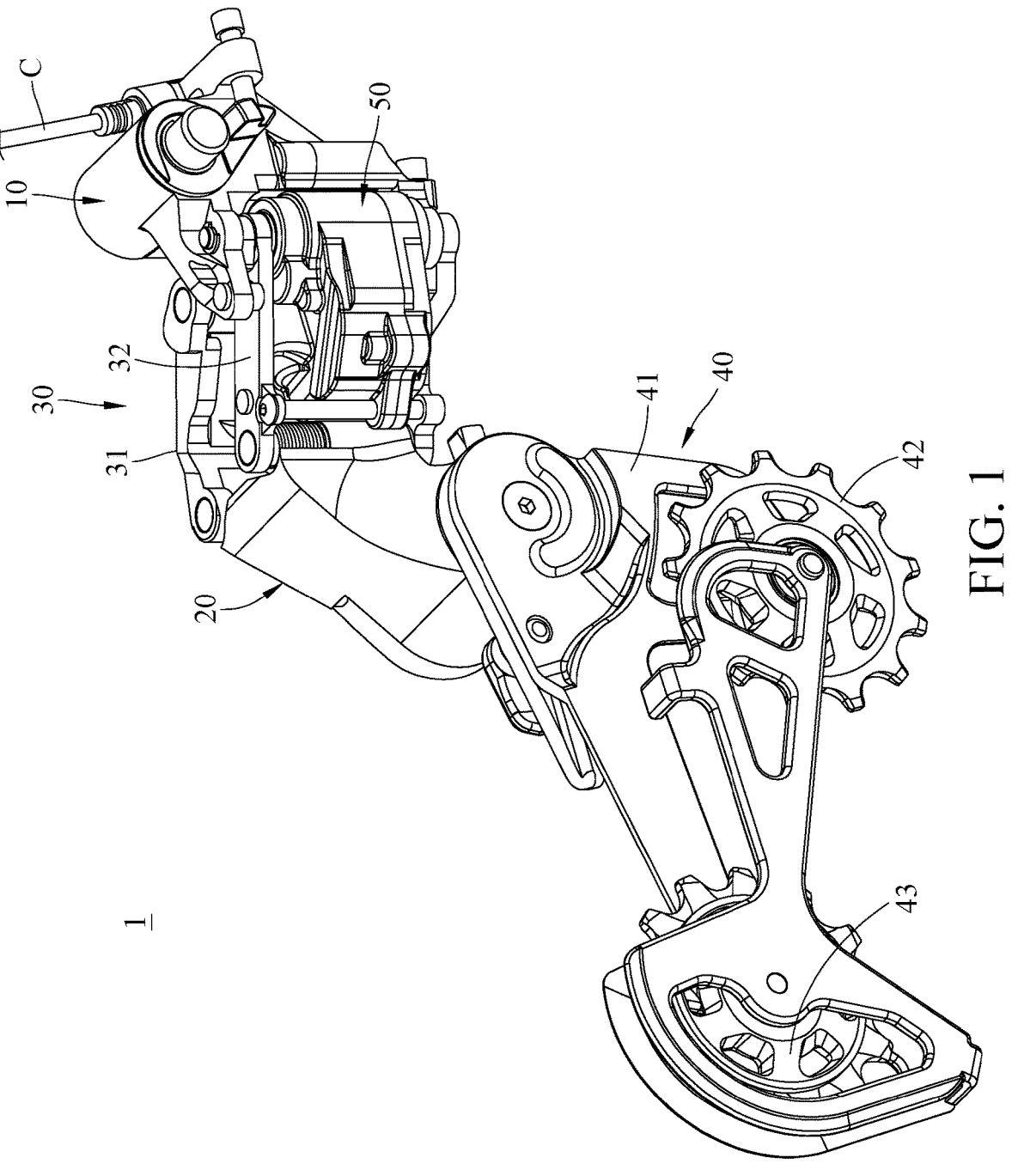
FIG. 1 is a perspective view of a bicycle rear derailleur and an external cable according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
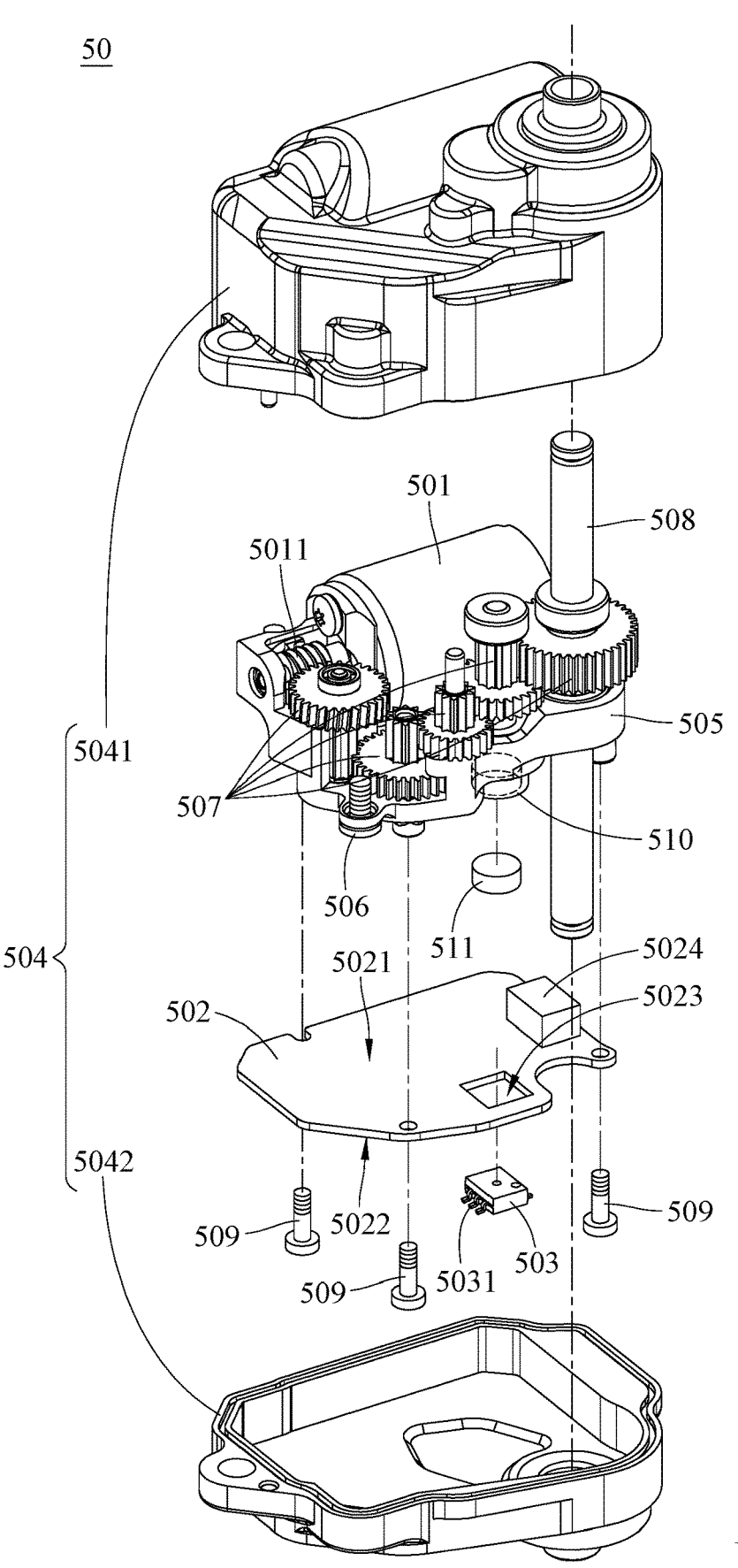
FIG. 2 is an exploded view of a transmission assembly of the bicycle rear derailleur in FIG. 1.
Figure 3:
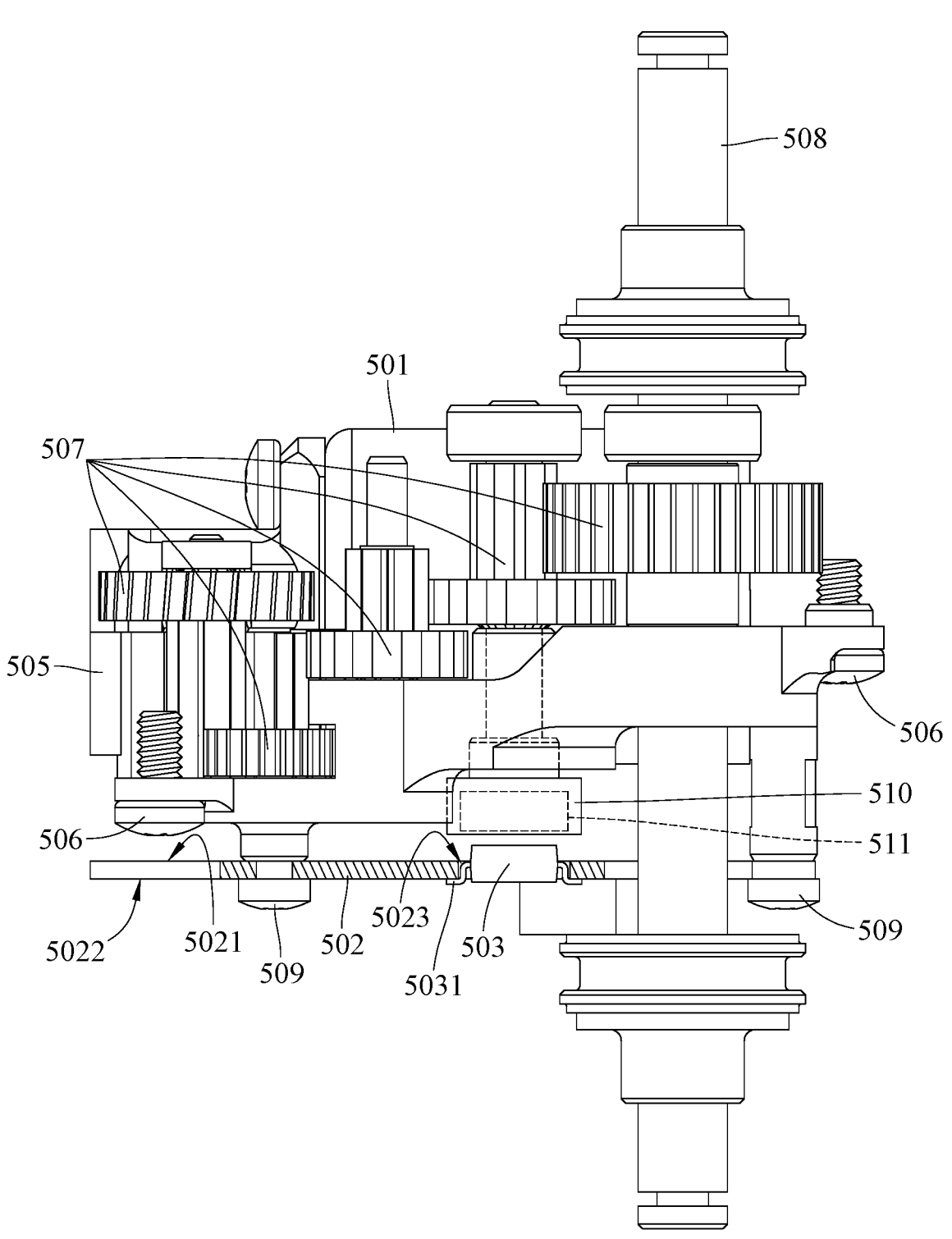
FIG. 3 is a side view of the transmission assembly in FIG. 3 when a casing is removed.

Referring to FIGS. 1 to 3, FIG. 1 is a perspective view of a bicycle rear derailleur 1 and an external cable C according to one embodiment of the disclosure, FIG. 2 is an exploded view of a transmission assembly 50 of the bicycle rear derailleur 1 in FIG. 1, and FIG. 3 is a side view of the transmission assembly 50 in FIG. 3 when a casing 504 is removed.

In this embodiment, the bicycle rear derailleur 1 is configured to be disposed on a bicycle frame (not shown). The bicycle rear derailleur 1 includes a base component 10, a movable component 20, a linkage assembly 30, a chain guide 40 and a transmission assembly 50.

The base component 10 is configured to be fixed to the bicycle frame. The linkage assembly 30 includes an outer link 31 and an inner link 32. The outer link 31 is located farther away from the bicycle frame than the inner link 32. Two opposite ends of the outer link 31 are pivotably disposed on the base component 10 and the movable component 20, respectively. Two opposite ends of the inner link 32 are pivotably disposed on the base component 10 and the movable component 20, respectively. The base component 10, the movable component 20, the outer link 31 and the inner link 32 together form a four-linkage mechanism. The chain guide 40 includes a frame 41, a guide pulley 42 and a tension pulley 43. The frame 41 is pivotably disposed on the movable component 20. The guide pulley 42 and the tension pulley 43 are rotatably disposed on the frame 41. The guide pulley 42 is configured to guide a bicycle chain (not shown), and the tension pulley 43 is configured to tension the bicycle chain.

The transmission assembly 50 includes a driving source 501, a circuit board 502 and a sensor 503. In addition, the transmission assembly 50 may further include a casing 504, a mount seat 505, a plurality of first fasteners 506, a plurality of transmission gears 507, a transmission shaft 508, a plurality of second fasteners 509, a support seat 510 and a sensing component 511.

The casing 504 includes a base 5041 and a cover 5042 assembled with each other. The first fasteners 506 are, for example, screws. The mount seat 505 is located in the casing 504, and the first fasteners 506 fix the mount seat 505 on the base 5041.

Note that the first fasteners 506 are optional components, and the mount seat 505 may be fixed on the base 5041 of the casing 504 via other manners (e.g., adhering or snap-fit manner).

The driving source 501 is, for example, a motor. The driving source 501 is fixed on the mount seat 505, and the driving source 501 has an output shaft 5011. The transmission gears 507 are rotatably disposed on the mount seat 505 and are connected to each other. One of the transmission gears 507 is connected to the output shaft 5011 of the driving source 501.

The transmission shaft 508 is, for example, integrally connected to one of the transmission gears 507 which is located farthest away from the output shaft 5011 of the driving source 501. Two opposite ends of the transmission shaft 508 are respectively disposed through the base 5041 and the cover 5042 of the casing 504. Power output by the output shaft 5011 of the driving source 501 can be transmitted to the transmission shaft 508 via the transmission gears 507 so as to move the movable component 20 relative to the base component 10 via the linkage assembly 30, and thus the chain guide 40 can guide the bicycle chain among sprockets of a rear cassette (not shown).

The second fasteners 509 are, for example, screws. The second fasteners 509 fix the circuit board 502 on the mount seat 505. Note that the second fasteners 509 are optional components, and the circuit board 502 may be fixed on the mount seat 505 via other manners (e.g., adhering or snap-fit manner).

The circuit board 502 is electrically connected to the driving source 501 via, for example, wires (now shown). The circuit board 502 has a first surface 5021, a second surface 5022 and a through hole 5023. The first surface 5021 faces the mount seat 505, and the second surface 5022 faces away from the first surface 5021. Two opposite ends of the through hole 5023 penetrate through the first surface 5021 and the second surface 5022, and the through hole 5023 is aligned with one of the transmission gears 507.

Figure 4:
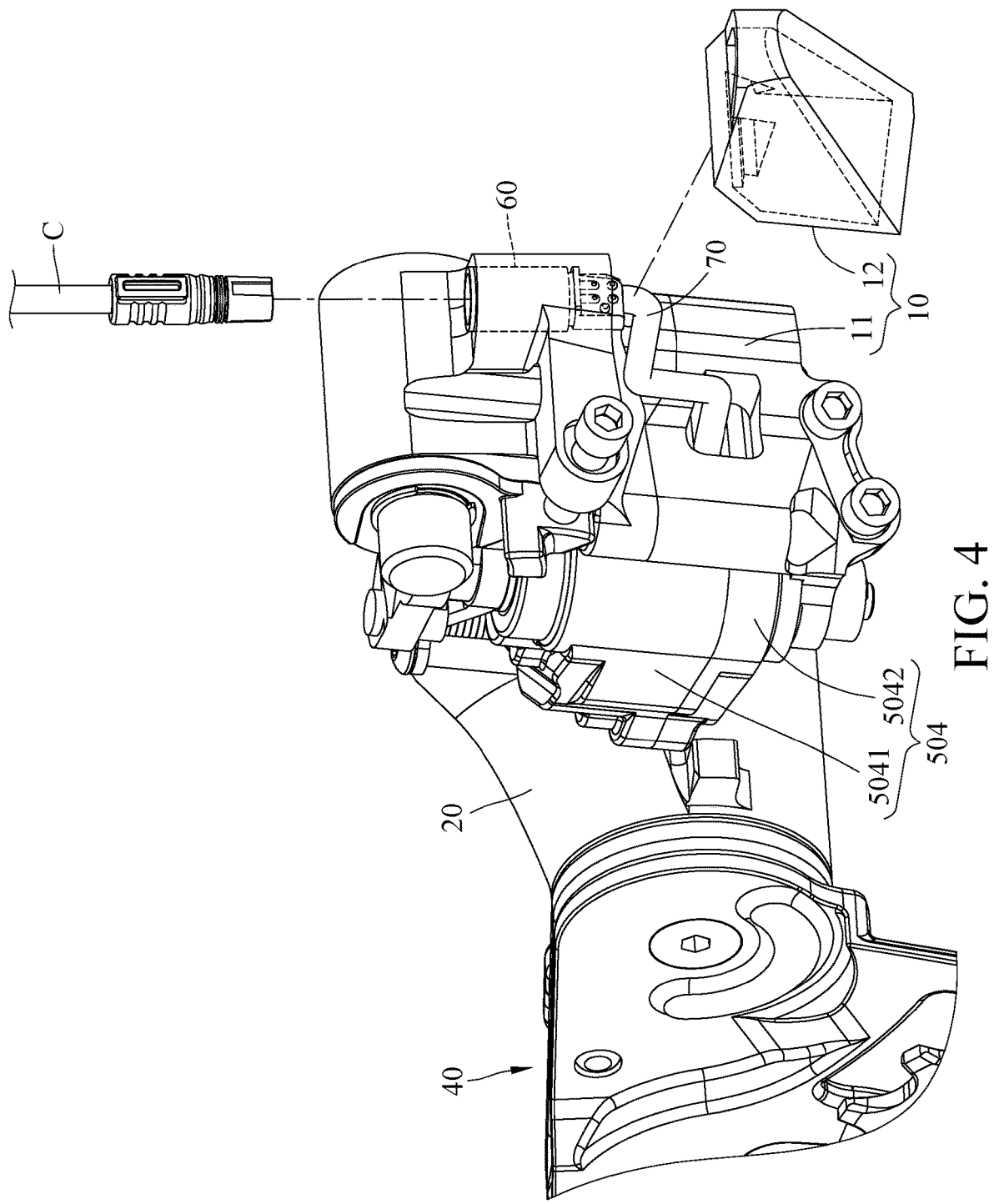
FIG. 4 is a partial exploded view of the bicycle rear derailleur and the external cable in FIG. 1.
Figure 5:
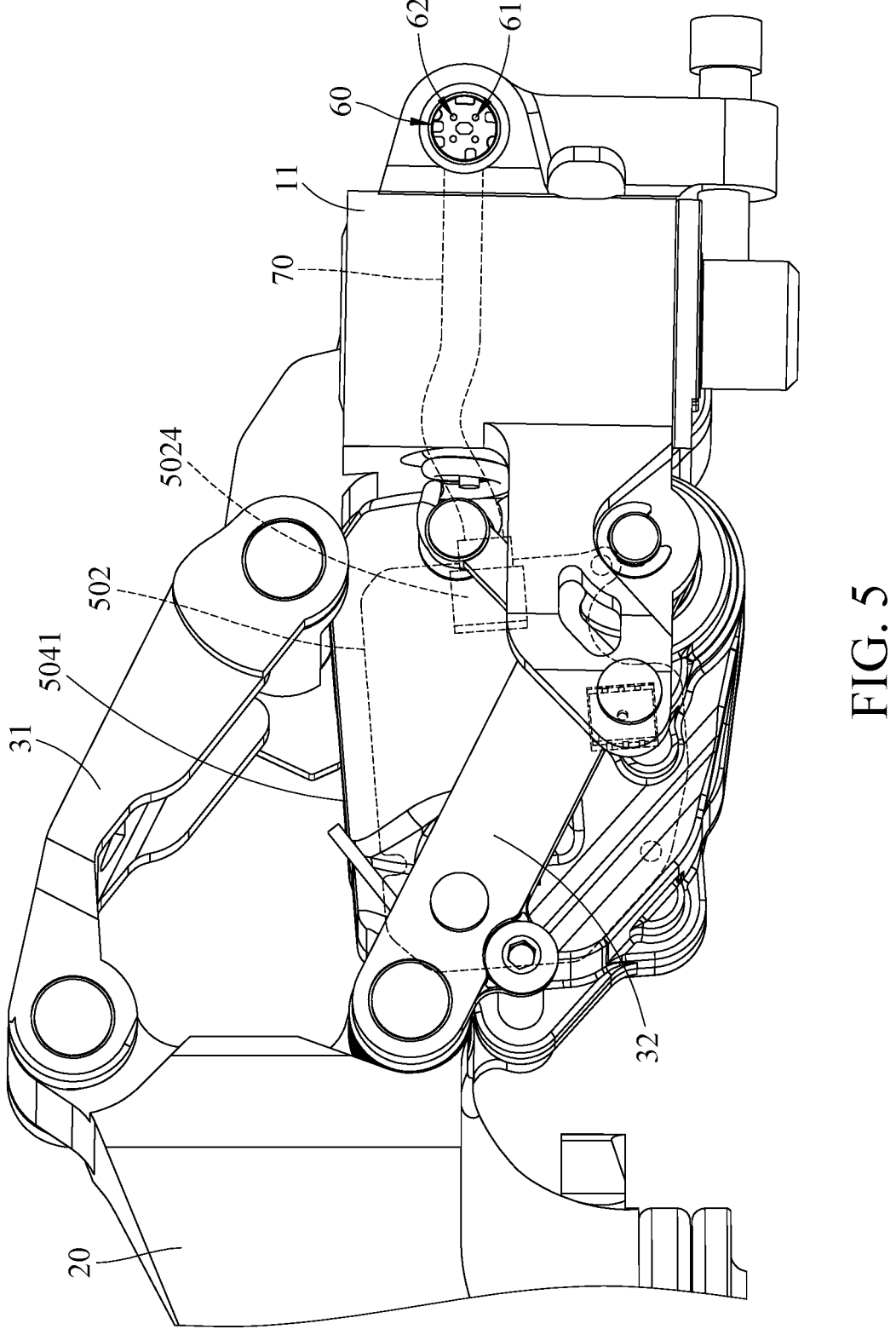
FIG. 5 is a partial top view of the bicycle rear derailleur in FIG. 1.

Then, referring to FIGS. 2, 4 and 5, FIG. 4 is a partial exploded view of the bicycle rear derailleur 1 and the external cable C in FIG. 1, and FIG. 5 is a partial top view of the bicycle rear derailleur 1 in FIG. 1.

In this embodiment, the circuit board 502 may further have an electrical connector 5024. The electrical connector 5024 is, for example, located on the first surface 5021. In addition, the bicycle rear derailleur 1 may further include an electrical socket 60 and a cable 70, and the base component 10 includes a main portion 11 and a covering portion 12. The electrical socket 60 is disposed in the main portion 11 of the base component 10, and the electrical socket 60 has a signal terminal 61 and a power terminal 62. One end of the cable 70 is inserted into the main portion 11 of the base component 10 and is connected to the electrical socket 60, and another end of the cable 70 is disposed through the main portion 11 of the base component 10 and the base 5041 of the casing 504 and is connected to the electrical connector 5024 of the circuit board 502. The cable 70 is partially exposed to outside of the main portion 11 of the base component 10, and the covering portion 12 is mounted on the main portion 11 and covers the cable 70.

In this embodiment, the electrical socket 60 is configured for an external cable C to be detachably mounted thereto. The external cable C is, for example, connected to shift control device (not shown). The shift control device can generate a shift signal, and the shift signal is transmitted to the circuit board 502 via the external cable C, the electrical socket 60 and the cable 70, such that the circuit board 502 activates the driving source 501 to operate for the shift of the bicycle rear derailleur 1. In addition, a power of the shift control device can provide electricity to the bicycle rear derailleur 1 via the external cable C for the operation of the bicycle rear derailleur 1.

Note that the electrical connector 5024 of the circuit board 502, the electrical socket 60, the cable 70 and the covering portion 12 of the base component 10 are optional components and may be omitted. In such a case, the shift signal generated by the shift control device can be transmitted to the circuit board via wireless manner, and the electricity required by the bicycle rear derailleur may be provided by a battery in the bicycle rear derailleur.

The sensor 503 is, for example, a Hall sensor. The sensor 503 has a plurality of pins 5031. The sensor 503 is partially located in the through hole 5023 of the circuit board 502, and the sensor 503 sticks out of the first surface 5021 of the circuit board 502, and the pins 5031 of the sensor 503 are connected to the second surface 5022 of the circuit board 502; that is, the first surface 5021 and the second surface 5022 of the circuit board 502 pass through the sensor 503.

The support seat 510 is fixed to the transmission gear 507 with which the through hole 5023 of the circuit board 502 is aligned. The sensing component 511 is, for example, a magnet. The sensing component 511 is disposed in the support seat 510. The sensor 503 measures a rotation position of one of the transmission gears 507 via the sensing component 511. The circuit board 502 controls the driving source 501 according to information measured by the sensor 503.

In this embodiment, the sensor 503 is partially located in the through hole 5023 of the circuit board 502, and the first surface 5021 and the second surface 5022 of the circuit board 502 pass through the sensor 503, which allows an overall thickness of the circuit board 502 and the sensor 503 to be reduced as much as possible. Therefore, the space in the casing 504 for accommodating the circuit board 502 and the sensor 503 can be reduced, and thus the bicycle rear derailleur 1 is small in size and is aesthetic in appearance.

Note that the first surface 5021 and the second surface 5022 of the circuit board 502 are not restricted to both passing through the sensor 503; in some other embodiment, the first surface of the circuit board may pass through the sensor, but the second surface of the circuit board may not pass through the sensor; that is, the sensor merely sticks out of the first surface of the circuit board but not stick out of the second surface of the circuit board. In another embodiment, the second surface of the circuit board may pass through the sensor, but the first surface of the circuit board may not pass through the sensor; that is, the sensor merely sticks out of the second surface of the circuit board but not stick out of the first surface of the circuit board.

In addition, the sensor 503 is not restricted to being partially located in the through hole 5023; in some other embodiments, the sensor may be entirely located in the through hole of the circuit board, and the pins of the sensor may be connected to an inner surface of the through hole. As a result, the overall thickness of the circuit board and the sensor is the thickness of the circuit board, and thus the space in the casing for accommodating the circuit board and the sensor can be further reduced, and the bicycle rear derailleur is smaller in size and is more aesthetic in appearance.

On other hand, the circuit board 502 is not restricted to having the through hole 5023; in some other embodiments, the circuit board may not have the through hole, and the sensor may be disposed on a side surface of the circuit board connected to the first surface and the second surface.

Note that the support seat 510 is an optional component. In some other embodiments, the transmission assembly may not include the support seat, and the sensing component may be directly fixed on the transmission gear.

On the other hand, the sensor 503 is not restricted to being a Hall sensor and may be modified to another type of a sensor which can measure the rotation position of the transmission gear, and the sensing component cooperated with the sensor may be modified according to the type of the sensor. When there is no need for the sensor to cooperate with the sensing component, the sensing component may be omitted.

In addition, the transmission gear 507 and the transmission shaft 508 are optional components and may be modified to other components or structures which can transmit the power of the driving source.

Furthermore, the casing 504 and the mount seat 505 of the transmission assembly 50 are optional components and may be adopted or omitted according to actual requirements.

Note that the transmission assembly 50 is not restricted to being applied to the bicycle device such as the bicycle rear derailleur 1. The transmission assembly 50 may be applied to another type of the bicycle device.

According to the bicycle rear derailleur and the transmission assembly of the bicycle device as discussed in the above embodiments, the sensor is partially located in the through hole of the circuit board, and the first surface and the second surface of the circuit board pass through the sensor, which allows an overall thickness of the circuit board and the sensor to be reduced as much as possible. Therefore, the space in the casing for accommodating the circuit board and the sensor can be reduced, and thus the bicycle rear derailleur is small in size and is aesthetic in appearance.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle rear derailleur, comprising:
 a base component;
 a movable component;
 a linkage assembly, pivotably connected to the base component and the movable component;
 a chain guide, pivotably disposed on the movable component; and
 a transmission assembly, disposed on the linkage assembly, wherein the transmission assembly comprises a driving source, a circuit board and a sensor, the driving source is configured to provide a power to the movable component to drive the movable component to move relative to the base component, the circuit board is electrically connected to the driving source, the circuit board has a first surface and a second surface located opposite to each other, the sensor is disposed on the circuit board, and the first surface and the second surface pass through the sensor,
 wherein a distance between the sensing component and the circuit board is smaller than a thickness of the sensor.

2. The bicycle rear derailleur according to claim 1, wherein the circuit board has a through hole, two opposite ends of the through hole penetrate through the first surface and the second surface, respectively, and the sensor is partially located in the through hole.

3. The bicycle rear derailleur according to claim 2, wherein the sensor sticks out of the first surface, the sensor has a plurality of pins, and the plurality of pins are connected to the second surface of the circuit board.

4. The bicycle rear derailleur according to claim 1, wherein the transmission assembly further comprises a plurality of transmission gears, a transmission shaft and a sensing component, the driving source is connected to the transmission shaft via the plurality of transmission gears, the sensing component is fixed on one of the plurality of transmission gears, and the sensor measures a rotation position of the one of the plurality of transmission gears via the sensing component.

5. The bicycle rear derailleur according to claim 4, wherein the sensor is a Hall sensor, and the sensing component is a magnet.

6. The bicycle rear derailleur according to claim 4, wherein the transmission assembly further comprises a support seat, the sensing component is fixed to the one of the plurality of transmission gears via the support seat.

7. A bicycle rear derailleur, comprising:

a base component;

a movable component;

a linkage assembly, pivotably connected to the base component and the movable component;

a chain guide, pivotably disposed on the movable component; and a transmission assembly, disposed on the linkage assembly, wherein the transmission assembly comprises a driving source, a circuit board and a sensor, the driving source is configured to provide a power to the movable component to drive the movable component to move relative to the base component, the circuit board is electrically connected to the driving source, the circuit board has a through hole, and the sensor is at least partially located in the through hole of the circuit board, wherein the circuit board has a first surface and a second surface located opposite to each other, two opposite ends of the through hole penetrate through the first surface and the second surface, respectively, the sensor sticks out of the first surface, the sensor has a plurality of pins, and the plurality of pins are connected to the second surface of the circuit board, wherein the transmission assembly further comprises a plurality of transmission gears, a transmission shaft, and a sensing component, the driving source being connected to the transmission shaft via the plurality of transmission gears, the sensing component being fixed on one of the plurality of transmission gears, and the sensor measuring a rotation position of the one of the plurality of transmission gears via the sensing component, and wherein a distance between the sensing component and the sensor is smaller than a thickness of the sensor or a thickness of the sensing component.

8. The bicycle rear derailleur according to claim 7, wherein the sensor is a Hall sensor, and the sensing component is a magnet.

9. The bicycle rear derailleur according to claim 7, wherein the transmission assembly further comprises a support seat, the sensing component is fixed to the one of the plurality of transmission gears via the support seat.

10. A transmission assembly of a bicycle device, comprising:

a driving source;

a plurality of transmission gears, connected to each other and configured to be driven by the driving source;

a magnet, disposed on one of the plurality of transmission gears and being rotatable;

a circuit board, electrically connected to the driving source, wherein the circuit board has a first surface, a second surface and a through hole, the first surface is located opposite to the second surface, and the through hole penetrates through the first surface and the second surface; and a sensor, at least partially located in the through hole of the circuit board for measuring a rotation of the magnet;

wherein the sensor sticks out of the first surface, the sensor has a plurality of pins, and the plurality of pins are connected to the second surface of the circuit board, wherein a distance between the magnet and the sensor is smaller than a thickness of the sensor or a thickness of the magnet.

* * * * *